United States Patent

Schwartz et al.

(10) Patent No.: US 9,065,982 B2
(45) Date of Patent: Jun. 23, 2015

(54) RECONFIGURABLE SURVEILLANCE APPARATUS AND ASSOCIATED METHOD

(75) Inventors: Steven Allen Schwartz, Melbourne Beach, FL (US); Kenneth Lee Morris, Melbourne, FL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 989 days.

(21) Appl. No.: 12/683,537

(22) Filed: Jan. 7, 2010

(65) Prior Publication Data

US 2011/0164137 A1    Jul. 7, 2011

(51) Int. Cl.
*H04N 7/18* (2006.01)
*G08B 13/196* (2006.01)

(52) U.S. Cl.
CPC .......... *H04N 7/181* (2013.01); *G08B 13/19621* (2013.01); *G08B 13/19636* (2013.01); *G08B 13/19697* (2013.01)

(58) Field of Classification Search
CPC ................ H04N 5/23238; G06T 2207/10032; G06T 2207/20221; H04B 1/03
See application file for complete search history.

(56) References Cited

U.S. PATENT DOCUMENTS

| | | | |
|---|---|---|---|
| 6,831,699 B2 * | 12/2004 | Chang et al. | 348/373 |
| 7,030,929 B2 * | 4/2006 | Chang et al. | 348/374 |
| 7,333,148 B2 * | 2/2008 | Chang et al. | 348/374 |
| 7,643,052 B2 * | 1/2010 | Gal et al. | 348/36 |
| 7,742,070 B2 * | 6/2010 | Glatt | 348/36 |
| 7,772,966 B2 * | 8/2010 | Turnbull et al. | 340/425.5 |
| 8,477,184 B2 * | 7/2013 | Hollinger | 348/82 |
| 2005/0024493 A1 | 2/2005 | Nam | |
| 2005/0270238 A1 * | 12/2005 | Jo et al. | 343/702 |
| 2006/0132643 A1 * | 6/2006 | Chang et al. | 348/373 |
| 2007/0171042 A1 * | 7/2007 | Metes et al. | 340/521 |
| 2011/0032368 A1 * | 2/2011 | Pelling | 348/211.9 |

OTHER PUBLICATIONS

D. Crane, "Eye Ball R1 Throwable Camera System for High-Risk Mil/LE Tactical Ops", Defense Review, May 15, 2005, pp. 1-3.
C. Mackenzie, Tech Watch, Defense Technology International, Aviation Week, Jan./Feb. 2007, 2 pgs.
"Crisstl Ball™", InterScience, Inc., 1 pg.
"ScoutBall™", MobileFusion, 2009, 2 pgs.

* cited by examiner

*Primary Examiner* — Ranodhi Serrao
*Assistant Examiner* — Thomas Richardson
(74) *Attorney, Agent, or Firm* — Robert P. Lenart, Esq.; Pietragallo Gordon Alfano Bosick & Raspanti, LLP

(57) ABSTRACT

An apparatus includes a housing; a plurality of cameras in the housing, each of the cameras being configured to capture image data of a portion of a scene external to the housing; an attitude detector for detecting an orientation of the housing; and a transmitter disposed within the housing, the transmitter being configured to transmit the image data and an orientation signal to a station disposed remotely from the scene. A method of using the apparatus is also provided.

17 Claims, 3 Drawing Sheets

RECONFIGURABLE SURVEILLANCE APPARATUS AND ASSOCIATED METHOD

FIELD OF THE INVENTION

This invention relates to surveillance equipment and, more particularly, to a reconfigurable sensing device and an associated receiving method.

BACKGROUND OF THE INVENTION

Military personnel, law enforcement personnel and first responders encounter a variety of dangerous situations on a regular basis. One specific dangerous situation involves the need to enter a building, cave, mine or structure (possibly partially collapsed), without knowing if combatants or other dangers lie ahead. This can expose the responders to extreme danger due to the possibility of booby-traps, ambush or environmental hazards (e.g. fire). The safety of the responders and probability of success of the mission is improved if information about the interior space and its contents is known before entry. Such information includes: the interior layout of a room, the number of occupants, what they are doing, where the occupants are located, whether the occupants are moving, where are they going, whether the occupants are armed, and whether the room contains any flammable gases, weapons or explosives.

Therefore, it is desirable to provide a practical and effective solution to gather information which minimizes the danger to military and/or law enforcement personnel while carrying out a particular mission.

SUMMARY OF THE INVENTION

In a first aspect, the invention provides an apparatus including: a housing; a plurality of cameras in the housing, each of the cameras being configured to capture image data of a portion of a scene external to the housing; an attitude detector for detecting an orientation of the housing; and a transmitter disposed within the housing, the transmitter being configured to transmit the image data and an orientation signal to a station disposed remotely from the scene.

In a second aspect, the invention provides an apparatus including: a housing; a plurality of cameras in the housing, each of the cameras being configured to capture image data of a portion of a scene external to the housing; an attitude detector for detecting an orientation of the housing; a processor receiving the image data and an orientation signal and producing a panoramic mosaic image showing the scene as it would appear if the cameras were in a predetermined orientation; and a transmitter disposed within the housing, the transmitter being configured to transmit the panoramic mosaic image to a station disposed remotely from the scene.

In another aspect, the invention provides a method of viewing a scene from a station disposed remotely thereto. The method includes: propelling a monitoring apparatus into an area of interest, wherein the monitoring apparatus includes a housing, a plurality of cameras in the housing, each of the cameras configured to capture image data of a portion of a scene external to the housing, an attitude detector for detecting an orientation of the housing, and a transmitter disposed within the housing, the transmitter being adapted to transmit the image data to a station disposed remotely from the scene; using the image data from the cameras and an orientation signal from the attitude detector to construct a panoramic mosaic image showing the scene as it would appear if the cameras were in a predetermined orientation; and viewing the panoramic image at a station remote from the area of interest.

DETAILED DESCRIPTION OF THE INVENTION

In one embodiment, this invention provides a baseball-sized apparatus that includes housing, a plurality of sensors in the housing, an attitude detector for detecting the orientation of the housing, and a transmitter for transmitting signals to a remote station. The apparatus can be thrown or otherwise projected into an area of interest, such as a room. In some embodiments, the apparatus can be a throwable mote.

Figure 1:
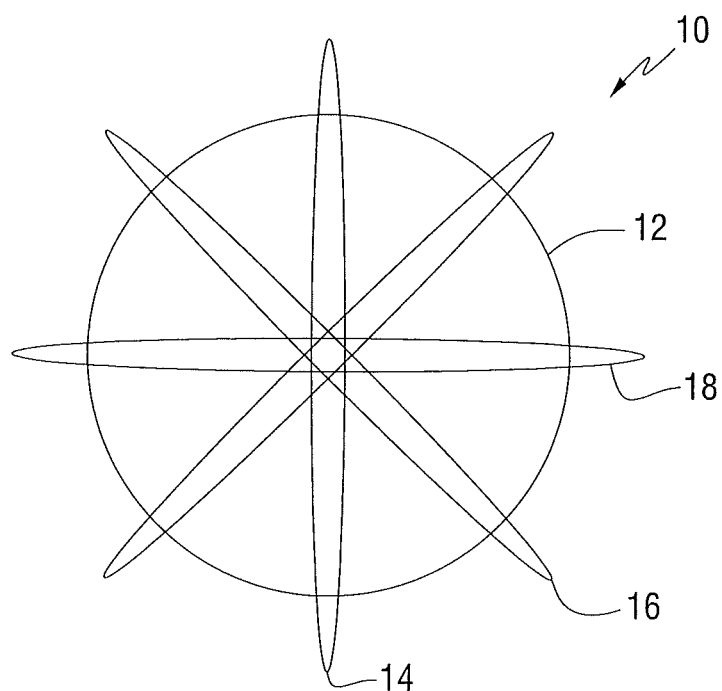
FIG. 1 is a schematic representation of an apparatus constructed in accordance with an embodiment of the invention.

FIG. 1 is a schematic representation of an apparatus (also called a deployable device, throwable mote, or "baseball") 10 constructed in accordance with an embodiment of the invention. The apparatus is shown to include a housing 12 and a plurality of hoops or bands 14, 16 and 18 positioned externally to the housing. The sensors, attitude detector and transmitter are not shown in this view.

While the embodiment of FIG. 1 shows a spherical housing, it should be understood that the housing can be various shapes, such as cubic or cylindrical. While a spherical housing can be easily thrown, the invention is not limited to any particular housing shape. The hoops are easy to grasp, and may partially protect the sensors and other components in the housing from damage through direct contact with walls or floors, or when the device is thrown through windows. In addition, at least one of the hoops can be made of a conductive material, such as a metal, and can serve as an antenna for a transmitter in the housing. Based upon orientation, one or more particular hoops may be used to function as a directional WiFi antenna. The hoops can be coupled to the housing by standoff posts (not shown) that may also function to mitigate shock. It should also be understood that the hoops can be replaced with one or more other structures that provide mechanical protection for the housing.

Figure 2:
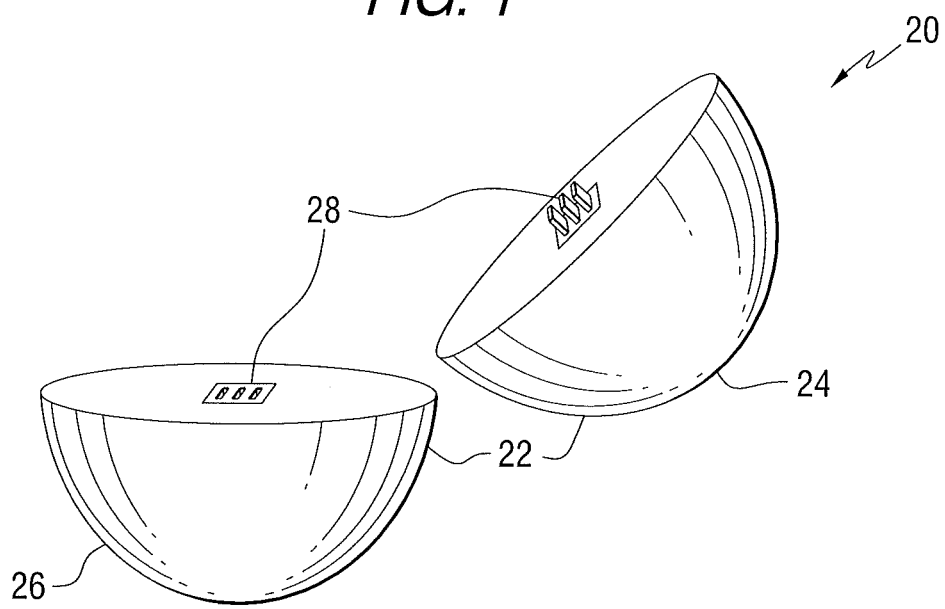
FIG. 2 is a schematic representation of an apparatus constructed in accordance with another embodiment of the invention.

FIG. 2 is a schematic representation of an apparatus 20 constructed in accordance with another embodiment of the invention. The apparatus is shown to include a housing 22, having a top portion 24 and a bottom portion 26. In this embodiment, the top portion houses a plurality of sensors and the bottom portion houses a microprocessor or other processing circuitry, and a power source, which can be a battery. A connector 28 is positioned between the top and bottom portions of the housing to provide an electrical connection between the components housed in the top and bottom portions.

As shown in FIG. 2, the housing can include two half spheres. In this embodiment, one half sphere contains the battery and microprocessor, and the other half sphere contains an interchangeable sensor or set of sensors. The connector is used to provide electrical contact between the two half spheres when they are attached together prior to use. Although the connector is shown as a three-pronged plug, it can be a standard computer interface such as USB or RS-232. In this way maximum compatibility with commercially available products is maintained, so costs are low. The electrical connection may also be supplied by a standard wiring harness.

Figure 3:
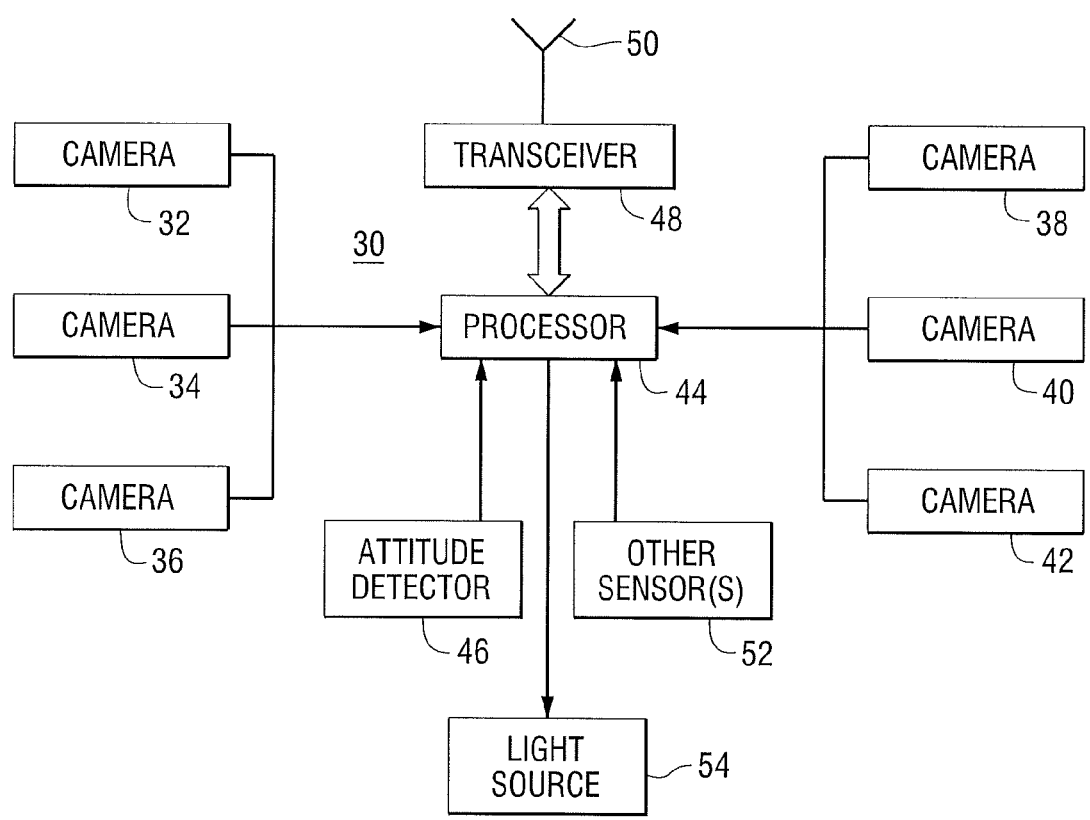
FIG. 3 is a block diagram of the components of an apparatus constructed in accordance with another embodiment of the invention.

FIG. 3 is a block diagram of the components of an apparatus 30 constructed in accordance with another embodiment of the invention. The apparatus includes six video cameras 32, 34, 36, 38, 40 and 42 that are configured to capture images of the scene in an area of interest. Each camera can have a 90° field of view (FOV) for full spherical coverage. The cameras can provide video, still, and/or thermal image data to a processor 44. An attitude detector 46 is provided within the housing. The attitude detector provides a signal that is representative of the orientation of the apparatus to the processor. The processor is configured to process the attitude data along with video data into a format that can be transmitted to a remote station. A transceiver 48 can transmit the data to the remote station using antenna 50. The transceiver may also be configured to receive signals from the remote station. Such received signals may be used to control the operation of the apparatus.

The attitude detector may include a pair of 3-axis accelerometers such as the Silicon Designs Model 2422-002 (±2 g full scale acceleration) and the Silicon Designs Model 2422-400 (±400 g full scale).

The Model 2422-400 (or an analogous device) distinguishes the throwing motion from lower accelerations (<100 g's) that occur when the "baseball" is being handled in preparation for throwing. Throwing motion acceleration can approach 400 g's or more. A typical throw by a layman (not a baseball pitcher) is estimated to have a minimum of 250 g's.

Gravity is only 1 part in 800 for the Model 2422-400, possibly below its sensitivity, which is why a separate accelerometer may be needed. The Model 2422-002 (or analogous device) must have sufficient sensitivity to detect the force of gravity (1 g). The Model 2422-002 senses the attitude of the throwable mote after landing and also in-flight. The attitude data are used to create a useful hemispherical mosaic of camera video imagery in the natural orientation of a human observer.

One or more other sensors 52 can be included to provide additional data that can be sent to the remote station. Such additional sensors can be, for example, singly or in combination, temperature sensors, explosive detectors, carbon dioxide detectors, or microphones.

A light source 54 can be provided to illuminate the scene. The light source can be controlled such that the scene is illuminated at a desired time. For example, if the device is thrown into a room, the light source can be activated while the device is in-flight, and the cameras can capture still images of the room as it appears from the location of the device when the images are taken.

The throwable mote can be used to capture an image of a scene when in-flight. After the Model 2422-400 (or an analogous device) detects the large acceleration of the throw, there is a period of time of little or no linear acceleration as the baseball follows a ballistic trajectory towards the building. The 2422-400 sensor can be monitored for a deceleration (or acceleration depending on orientation of the accelerometer relative to motion) at the moment of impact with a window. At the moment of impact, a timing function can be initiated by the onboard processor in order to identify the moment at which to initiate the light flash. Because the size of the room is not known a priori, a rule of thumb is that the flash is desired to occur at a point in space about 5 feet (~1.5 meters) after breaking through the window. The 5 foot (~1.5 meters) distance is chosen because it is likely that a room for human habitation is at least 10 feet (~3 meters) on a side.

The time at which the throwable mote reaches the point in space that is 5 feet (~1.5 meters) from the window can be estimated in two ways: (1) assume a typical throwing speed of 60 m/s and simply delay the flash for a 25 ms; and (2) estimate the velocity of the baseball by integrating over time the acceleration that is recorded during the throw, less the integral of deceleration during the moment of window impact.

Some combination of the above two estimates could be used, such as the time based upon the integrated acceleration/deceleration but no less than 25 ms. Any of these methods ensures that the flash goes off after the window impact.

If there is no window, then the flash will occur after impact with an opposing wall or the floor that will be interpreted by the software as being a window. This is not ideal, but may provide a beneficial freeze frame.

In theory a freeze frame could be achieved by a very short shutter speed and a very sensitive focal plane array, but this requires an expensive camera. Using a flash light source can provide the same effect and can be activated in a manner that is designed to startle occupants of the room. An ultra bright white light must be of short enough duration that there is little smearing of the image frame during the flash time.

In one example, suppose it is desired to have a freeze frame with 1 inch resolution and each camera pixel has an instantaneous field of view of 4 mrad. First note that an iFOV of 4 mrad translates into 1.2 cm resolution of an object at 3 meters. If the throwable mote is traveling 60 m/s it will travel 1.2 cm in only 0.2 ms. So if the camera shutter is open for 0.2 ms, then the 1.2 cm blurring due to baseball motion combined with the 1.2 cm camera resolution results in a net resolution of 2.4 cm (about 1 inch).

A typical camera operates at 30 fps and so the shutter can be open no more than 30 ms for each frame, but 15 ms is typical. This is 75 times longer than the desired 0.2 ms time for freezing the frame in the prior example.

One solution to this problem is to provide a flash with a brightness that provides lighting that is 150 times brighter than the room lighting during the 0.2 ms interval. The photons from the flash will dominate the measurement that occurs during the rest of the 15 ms open-shutter interval. This method thereby provides a 3 dB signal-to-noise ratio (SNR) with a 1 inch resolution photon collected during the short but brighter 0.2 ms flash time, compared to the smeared photons collected over the entire 15 ms open shutter time.

A 0.1 ms flash time is achievable with a xenon tube and it will provide more than 1000 lux at 1 m. For example the flash in the Sony Ericsson K800 cell phone delivers 205,000 lux at 1 m for 0.1 ms. At 3 m this is still 20,500 lux, more than enough to light the room for a 0.5 lux camera. If the 0.1 ms flash is not adequate for producing the flash-blindness effect in humans, it can be flashed a second time, for example for a 200 ms duration.

The processor in the deployable device can be configured to process signals from a plurality of interchangeable sensors. The interchangeable sensors can include for example image sensors, explosive detectors, or magnetometers. If commercial off-the-shelf (COTS) interconnects are not used, then a combined mechanical/electrical twist and lock connector might be more convenient in the field.

The housing can be configured to accommodate the various sensors. For example, it can include openings to accommodate lenses for the cameras, or transparent portions to allow the cameras to capture images through the housing. In all embodiments, the housing may also contain materials or active equipment to absorb shock in order to protect the payload.

In various embodiments, this invention can provide an inexpensive, surveillance device that is capable of supporting interchangeable sensors. The use of interchangeable or multiple sensors (for example, chemical, biological, and/or nuclear sensors) can provide the possibility of adding specialized sensors such as explosive detectors. The device can be further reconfigured to contain other devices such as communications relays. This will allow data from a second deployable device to be relayed through a repeating/rebroadcasting system in the first deployable device to a remote station, and so forth for N deployable devices. This would enable multiple throwable motes to be used as a "trail of crumbs" into a cave, or as an organically deployed perimeter observation system. In this description, the term "organic" is utilized in the military sense to denote adaptiveness in response to unpredictable situations that evolve during operations in the field.

Figure 4:
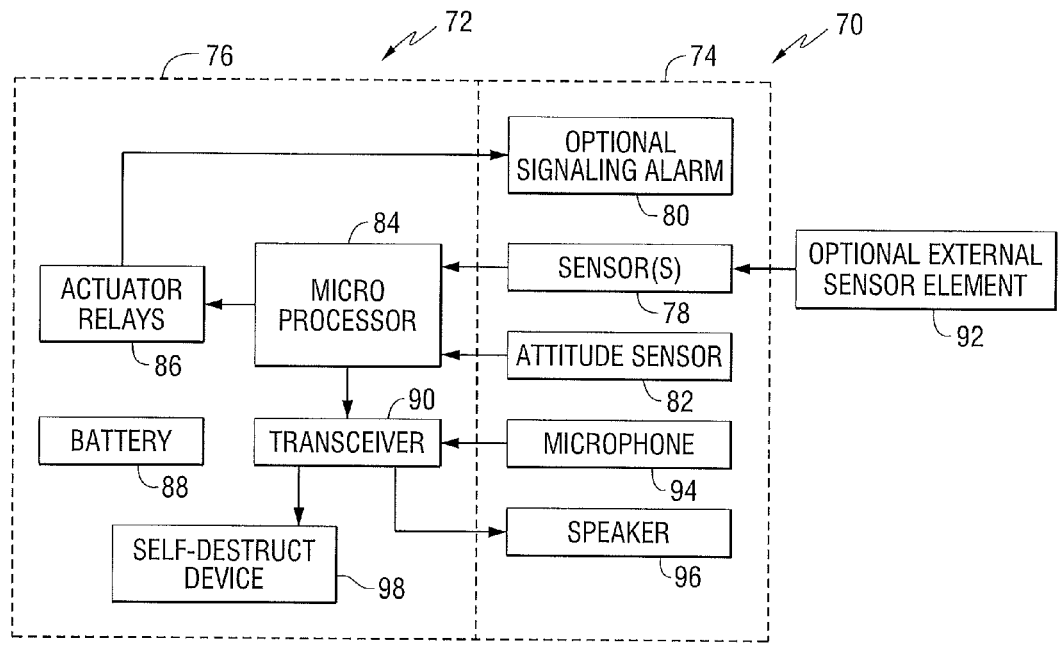
FIG. 4 is a block diagram of the components of an apparatus constructed in accordance with another embodiment of the invention.

FIG. 4 is a block diagram of the components of an apparatus 70 constructed in accordance with another embodiment of the invention. The embodiment of FIG. 4 includes a housing 72, having a top portion 74 and a bottom portion 76. The top portion houses a plurality of sensors 78, an alarm 80, and an attitude sensor 82. The bottom portion houses a microprocessor 84, actuator relays 86, a power source 88, which can be a battery, and a transceiver 90. If at least one of the sensors is an explosive detector, a sensing element 92 for that sensor may be positioned outside of the housing in order to obtain an air sample. The sensing element may be mounted in a recess in the housing or may protrude from the sphere into the region protected by the hoops illustrated in FIG. 1.

In the embodiment of FIG. 4, the apparatus is configured to provide a warning of explosives at hostile sites, such as an improvised explosive device (IED) factory or safe house. In FIG. 4, the arrows represent signal flow. The power connections are not shown in order to keep the diagram simple. The alarm may be a simple horn, or a wireless signaling unit. The explosive detector may be, for example, a fluorescent TNT sensor.

In use, the apparatus can be thrown or otherwise propelled into a building that is suspected of containing a relatively large quantity of explosives. If the onboard explosive detection sensor detects explosives, the apparatus may sound an alarm, such as an onboard horn, or the apparatus may send an alarm signal via radio to a remotely positioned receiver. If the alarm is heard, the soldiers could then secure the building that is suspected of being wired to explode.

In the embodiment of FIG. 4, the apparatus may include an explosive detection sensor, and may also contain a combination of sensors and/or other devices that may be of use to a soldier. For example, it may contain one or more video cameras (as shown in FIG. 3) so that pictures may be obtained. A microphone 94 can be included to detect conversation, and/or a WiFi router may be included to enable communications within the building during the time in which the area is being secured. A speaker 96 could be incorporated so that 2-way communication is facilitated. This would allow instructions to be sent to the human occupants in case of a collapsed building. A self-destruct device 98 could also be included. The self-destruct device could be connected to the transceiver, and could be triggered by a signal from a remote station.

Figure 5:
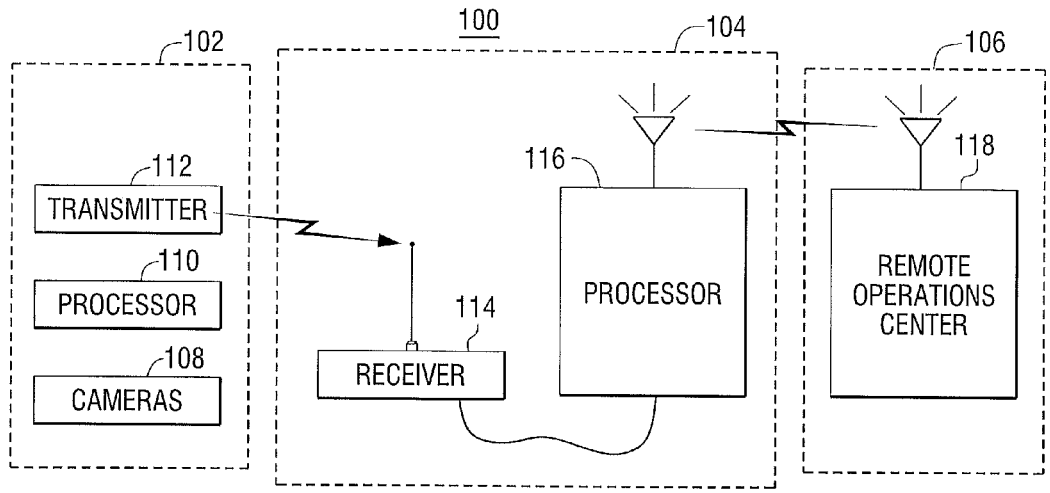
FIG. 5 is a schematic representation of a surveillance system constructed in accordance with another embodiment of the invention.

In various embodiments, the device can transmit signals to, and possibly receive signals from, a remote station. FIG. 5 is a schematic representation of a surveillance system 100 constructed in accordance with another embodiment of the invention. The system includes a sensor device, or throwable mote 102, a receiver system 104, and one or more user stations 106, that can include for example a computer with a wireless interface. The sensor device 102, can be constructed in accordance with the previously described embodiments, and can include one or more cameras 108, a processor 110 and a transmitter 112 that transmits a signal to a receiver 114 in a remote location. The receiver can be coupled to a computer or other type of processor 116 that includes a frame grabber and can rebroadcast the received signal. Either the deployable device or the receiver system will include software that uses the attitude data and video data from the sensor to stitch and orient the camera images together (so the image is not upside down in the display for instance). The resulting panoramic mosaic can be transmitted to a remote operations center 118, for example over the Internet.

From the above description, it should be apparent that in one aspect, the invention provides an apparatus including a housing; a plurality of cameras in the housing (also referred to as the "baseball"), each of the cameras being configured to capture image data of a portion of a scene external to the housing; a 3-axis accelerometer functioning as an attitude detector for detecting both the impact with a glass window after being thrown, and the orientation of the housing upon landing; a transmitter disposed within the housing, the transmitter being configured to transmit the image data and an orientation signal to a station disposed remotely from the scene; and an optional bright flash to be triggered a certain period of time after impact with the window is detected.

The flash facilitates production of a freeze frame while the apparatus is in mid-air within the room, or possibly after landing. The freeze frame flash also may function as a "flash bang" to disorient human occupants without injuring them. If the flash that is designed for facilitating the freeze frame is too fast to create flash blindness, it can be flashed a second time for a longer period. (The human eye is more responsive to flashes that persist at least 200 ms.)

In another aspect, the invention provides a method for viewing the live video and the freeze frame from a station disposed remotely thereto. Apparatus that implements the method includes software that uses the attitude data to construct a mosaic video stream that presents the room in the correct orientation (right side up) for viewing and understanding by a human operator. The software may be hosted within the throwable housing or within the receiver system. The freeze frame may be depicted on a separate monitor, in a separate window, or as picture-in-picture. The freeze frame depicts the room at a moment before the occupants have had a chance to react to the baseball entry.

If soldiers are to carry these sensor systems, they may be used organically to create perimeter observation points in the field. For example, in an urban firefight, a soldier could roll a throwable mote around a corner in order to safely obtain a view without risk. Soldiers could position throwable motes around a forward position for a perimeter watch capability.

While the invention has been described in terms of several embodiments, it will be apparent to those skilled in the art that various changes can be made to the described embodiments without departing from the scope of the invention as set forth in the following claims.

What is claimed is:
1. An apparatus comprising:
a housing;

a plurality of cameras in the housing, each of the cameras being configured to capture image data of a portion of a scene external to the housing;
an attitude detector configured to detect an orientation of the housing and produce an orientation signal that is representative of an orientation of the apparatus;
a transmitter disposed within the housing, the transmitter being configured to transmit the image data and the orientation signal to a station disposed remotely from the scene;
a plurality of hoops encircling the housing wherein one or more of the hoops serves as an antenna system for the transmitter; and
further comprising at least one of:
a receiver configured to receive signals from the remotely disposed station;
a self-destruction device connected to a receiver triggered by a signal from the remote station to destroy the apparatus; and
a two-wag speakerphone to enable communication with occupants in the scene.

2. An apparatus according to claim 1, wherein the cameras comprise:
video cameras, each including a 90° field of view and each oriented in a different direction with respect to the housing to provide 360° coverage of the scene.

3. An apparatus according to claim 1, wherein the attitude detector comprises: first and second 3-axis accelerometers having different sensitivities.

4. An apparatus according to claim 3, wherein:
the first 3-axis accelerometer distinguishes acceleration resulting from propelling the housing from lower accelerations that occur when the housing is being handled; and the second 3-axis accelerometer detects the force of gravity.

5. An apparatus according to claim 1, further comprising:
a motion sensor configured to actuate the cameras to capture the image data upon detection of motion in the scene.

6. An apparatus according to claim 1, further comprising:
a communications link between the transmitter and another apparatus for relaying the image data to the remote station.

7. An apparatus comprising:
a housing;
a plurality of cameras in the housing, each of the cameras being configured to capture image data of a portion of a scene external to the housing;
an accelerometer;
a light source for illuminating the scene;
a processor configured to initiate a flash from the light source in response to a signal from the accelerometer, the processor receiving the image data and the orientation signal and producing a panoramic mosaic image showing the scene as it would appear if the cameras were in a predetermined orientation;
a transmitter disposed within the housing, the transmitter being configured to transmit the panoramic mosaic image to a station disposed remotely from the scene; and
further comprising at least one of:
a receiver configured to receive signals from the remotely disposed station;
a self-destruction device connected to a receiver triggered by a signal from the remote station to destroy the apparatus; and
a two-way speakerphone to enable communication with occupants in the scene.

8. An apparatus according to claim 7, wherein the cameras comprise:
video cameras, each including a 90° field of view and each oriented in a different direction with respect to the housing to provide 360° coverage of the scene.

9. An apparatus according to claim 7, wherein the attitude detector comprises:
first and second 3-axis accelerometers having different sensitivities.

10. An apparatus according to claim 9, wherein the first 3-axis accelerometer distinguishes acceleration resulting from propelling the housing from lower accelerations that occur when the housing is being handled; and the second 3-axis accelerometer detects the force of gravity.

11. An apparatus according to claim 7, further comprising:
a plurality of hoops encircling the housing wherein one or more of the hoops serves as an antenna system for the transmitter and/or the receiver.

12. An apparatus according to claim 7, further comprising:
a communications link between the transmitter and another apparatus for relaying the image data to the remote station.

13. A method of viewing a scene from a station disposed remotely thereto, said method comprising:
propelling a monitoring apparatus into an area of interest, the monitoring apparatus comprising:
a housing;
an accelerometer;
a light source for illuminating the scene;
a plurality of cameras in the housing, each of the cameras configured to capture image data of a portion of a scene external to the housing;
an attitude detector configured to detect an orientation of the housing and produce an orientation signal that is representative of an orientation of the apparatus;
a processor configured to initiate a flash from the light source at a predetermined time after the monitoring apparatus breaks a window, or strikes a wall or floor; and
a transmitter disposed within the housing, the transmitter being adapted to transmit the image data to a station disposed remotely from the scene;
using the image data from the cameras and the orientation signal from the attitude detector to construct a panoramic mosaic image showing the scene as it would appear if the cameras were in a predetermined orientation; and
viewing the panoramic image at a station remote from the area of interest.

14. The method of claim 13, wherein the step of using the image data from the cameras and an orientation signal from the attitude detector to construct a panoramic mosaic image showing the scene as it would appear if the cameras were in a predetermined orientation is performed in a processor in the monitoring apparatus.

15. The method of claim 13, wherein the step of using the image data from the cameras and an orientation signal from the attitude detector to construct a panoramic mosaic image showing the scene as it would appear if the cameras were in a predetermined orientation is performed in a processor in the remote station.

16. The method of claim 13, wherein the monitoring apparatus includes a communications relay, and the method further comprises: using additional monitoring apparatus to communicate with the communications relay to enable perimeter monitoring.

17. The method of claim 13, wherein the attitude detector comprises first and second 3-axis accelerometers having different sensitivities.

* * * * *